United States Patent [19]
Merchant

[11] 4,231,066
[45] Oct. 28, 1980

[54] ELECTRONIC ZOOM SYSTEM IMPROVEMENT

[75] Inventor: John Merchant, Needham, Mass.
[73] Assignee: Honeywell Inc., Minneapolis, Minn.
[21] Appl. No.: 2,832
[22] Filed: Jan. 12, 1979
[51] Int. Cl.³ .......................... H04N 3/22; H04N 5/26
[52] U.S. Cl. ..................................... 358/180; 358/225
[58] Field of Search ................. 358/180, 183, 113, 22, 358/217, 225, 226, 125, 126, 93, 104, 108, 109

[56] References Cited

U.S. PATENT DOCUMENTS

| | | | |
|---|---|---|---|
| 3,257,505 | 6/1966 | VanWechel | 358/126 |
| 3,705,328 | 12/1972 | Torok | 358/180 |
| 3,714,373 | 1/1973 | Kuhn | 358/126 |
| 3,729,582 | 4/1973 | Deye et al. | 358/126 |
| 3,736,376 | 5/1973 | Kato, Jr. | 358/126 |
| 3,828,122 | 8/1974 | McPhee et al. | 358/126 |
| 3,859,460 | 1/1975 | Westell | 358/125 |

OTHER PUBLICATIONS

"Automated Image Enhancement Techniques for Second Generation FLIR", Draft Interim Report, May 1977, Document No. 77-5-1, Honewyell Radiation Center.
"Quick-Reaction Target Acquisition for Thermal Image Systems", Document No. 77-1-11, Honeywell Radiation Center and Systems and Research Center.

Primary Examiner—John C. Martin
Attorney, Agent, or Firm—Charles J. Ungemach

[57] ABSTRACT

An improvement to an electronic zoom system allows operation with a single vidicon camera and an electronic storage means to provide a viewer with zoom capability and a display that has effectively no loss of resolution.

10 Claims, 3 Drawing Figures

ELECTRONIC ZOOM SYSTEM IMPROVEMENT

BACKGROUND OF THE INVENTION

In the John Merchant and John B. McCullough patent application Ser. No. 1,049, filed Jan. 5, 1979, and assigned to the assignee of the present invention, an electronic zoom system is described which can be used by a viewer so as to zoom on subjects within the field of view of the cameras and increase the magnification of the image being viewed without effective loss of resolution so as to see the magnified image in greater detail than was possible in prior art electronic zoom systems.

Because of the relatively high cost of vidicon cameras and particularly in the field of infrared radiation where infrared cameras are quite expensive, it is desirable to provide a zoom system which would minimize the number of cameras used.

SUMMARY OF THE INVENTION

The present invention provides a system which utilizes a single vidicon camera or infrared sensing camera to produce electronic zooming similar to, and with the same advantages as, that found in the above-mentioned copending application Ser. No. 1,049. Instead of employing two or more separate cameras each with a fixed lens of different fields of view, a single camera is used which has a turret mounting one or more lenses of different field of views. A wide angle field of view lens is used when normal operation is desired. When zooming is commanded the turret is moved so as to bring the narrow field of view lens into operative position for use with the camera. At the initiation of the zoom signal command, the wide field of view output signals from the camera are stored in a storage device which is then connected to the zoom system to provide the viewer with a continuous wide field of view scene while the turret is moving and the camera is not receiving an image. When the narrow field of view lens is in the proper position, the wide field of view signal from the storage means is mixed with the narrow field of view signal from the camera in the manner described in the above-mentioned copending application Ser. No. 1,049 so as to provide the desired zoom effect.

If extreme accuracy or realism is desired and if motion of the scene is occurring or the camera is being moved during the changing of lenses, a video rate sensor and camera motion sensor can be employed to provide signals to the storage device and cause appropriate motion of the stored scene so that the viewer will see a normally changing scene during the short time until the narrow field of view lens is in position.

DETAILED DESCRIPTION OF THE PREFERRED EMBODIMENT

Figure 1:
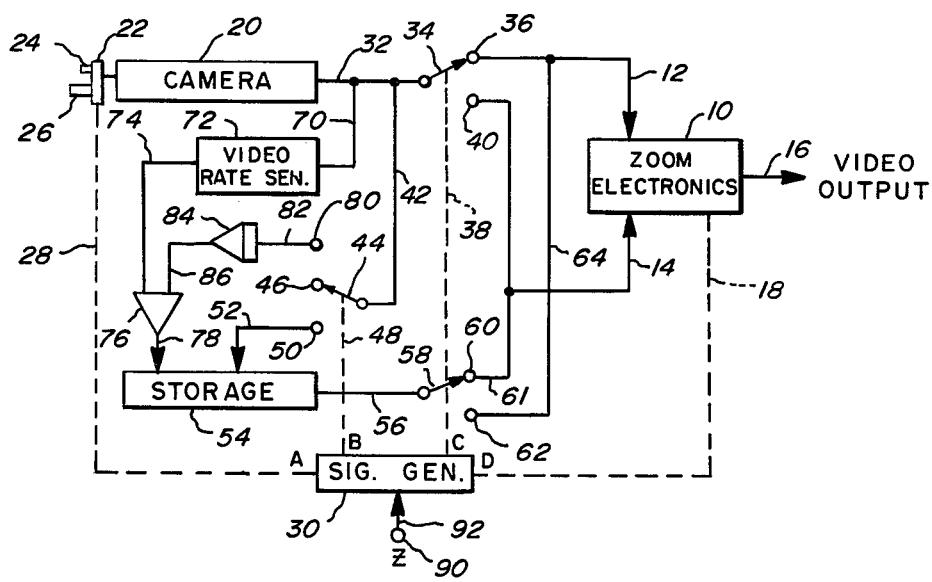
FIG. 1 shows a schematic and block diagram of the apparatus of the present invention.

In FIG. 1, a box 10, identified by the words "zoom electronics", is shown which box may contain circuitry like that shown in the above-referred to copending application Ser. No. 1,049. More particularly, a first input connection 12, a second input connection 14, an output connection 16 and a mechanical input connection 18 may correspond to the wide and narrow field of view video inputs, the video output and the zoom command inputs of the above-referred to copending application Ser. No. 1,049 respectively.

In FIG. 1, a camera 20, which may be a vidicon or an infrared camera such as a FLIR, is shown having a turret 22 which holds two lenses 24 and 26. Lens 24 may be a wide angle view lens having, for example, a 20 degree field of view while lens 26 may be a narrow field of view lens having, for example, a 2 degree field of view. Turret 22 is rotatable so as to present either lens 24 or 26 in front of camera 20. The position of turret 22 is controlled by mechanical connection 28 which is controlled from an output A of a signal generator 30 to be later described. Upon the occurrence of an output A from signal generator 30, mechanical connection 28 will rotate turret 22 so as to interchange lenses 24 and 26. This will occur during a time which may be approximately ½ second.

The output of camera 20 is shown on a conductor 32 connected to a switch arm 34. Switch arm 34 is shown in FIG. 1 contacting a terminal 36 which is connected to conductor 12 so as to provide a wide field of view video signal to the zoom electronics 10. Upon actuation by a mechanical connection 38 connected to an output C of signal generator 30, switch arm 34 will move to contact a terminal 40 which is connected to conductor 14 so as to provide a narrow field of view video input signal to the zoom electronics 10.

The output of vidicon camera 20 is also connected by a conductor 42 to a switch arm 44 shown in FIG. 1 contacting a terminal 46 which is open or not connected to anything. Upon actuation by a mechanical connection shown as dashed line 48 connected to an ouput B of signal generator 30, switch arm 44 will move to contact a terminal 50 shown connected by a conductor 52 to a storage device 54. Storage device 54 may be of the kind described as a "scan converter" in FIG. 6 of the above-mentioned copending application Ser. No. 1,049 which consists of a "write" circuit which receives the output from the camera 20 to store an image representative of scene viewed by camera 20 and a "read" circuit that converts the image stored by the "write" circuit to a signal like that from camera 20, when the radiation is visible, so that video signals are presented from storage device 54 to the zoom electronics 10. In the event that camera 20 is an infrared sensing device such as a FLIR, there would, of course, need to be a scan converter as a part of the zoom electronics as is described in the above-mentioned copending application Ser. No. 1,049.

The "read" circuit of storage device 54 scans the image stored by the "write" circuit of storage device 54 and produces video output signals on a conductor 56 shown in FIG. 1 connected to a switch arm 58. Switch arm 58 is shown contacting a terminal 60 which is connected by a conductor 61 to the second input connection 14 of zoom electronics 10. Switch arm 58 is operated by the mechanical connection 38 connected to output C of signal generator 30 so that upon actuation, switch arm 58 will move a terminal 62 which is connected by a conductor 64 to the first input connection 12 of zoom electronics 10.

As will be seen in the description of operation below, the circuits so far described will provide zoom capabilities under most normal operating conditions. In some cases, however, there may be considerable motion of the camera 20 or motion of the scene being viewed in which case it may be desirable to simulate this motion while the turret 22 is changing positions and while the zoom effect is occurring. To provide for target motion and camera motion, an additional input to the storage device 54 may be used. In FIG. 1, the output of camera 20 on conductor 32 is shown connected by a conductor 70 to a video rate sensor 72. Video rate sensor is a device which produces an output signal indicative of the rate of motion of the scene being viewed by camera 20 and may be, for example, a differentiated version of a position signal like that shown in U.S. Pat. No. 3,859,460, issued Jan. 7, 1975. Differentiation, to produce rate from position, can be approximated (to sufficient accuracy) by standard capacitor-resistor circuits well known in the art. This video rate signal is presented by a conductor 74 to one input terminal of a summing circuit 76. The output of summing circuit 76 is shown connected by a conductor 78 to the storage device 54 and supplies a signal to the "write" circuit which will cause the image stored by the "write" circuit to simulate the motion of the objects in the field of view last seen by camera 20. This simulated motion will continue during the time that a storage device 54 is providing an input to the zoom electronics 10. In similar fashion, assuming the camera 20 is mounted on a base or platform which is moved by an operator or is automatically positioned, a platform control signal which is indicative of the camera motion is presented on a terminal 80 which is connected by a conductor 82 to an integrator 84. The output of integrator 84 will be a signal indicative of the rate of change of position of camera 20 and this will be presented by a conductor 86 to the other input terminal of summing circuit 76. This signal then will also be presented by conductor 78 to the "write" circuit of storage device 54 so that the image stored in the "write" circuit will move to simulate any camera motion that may occur during the turret change or during the zooming process.

In both cases, as the image in the "write" portion of the circuit changes under the influence of either or both the video rate sensor signal and the platform control signal, the "read" circuit will detect this motion and produce a signal to the zoom electronics so that the viewer will observe the approximately proper motions occurring during the time when there is no lens in front of camera 20 and when the zoom effect is taking place.

A sequence of operation of the circuit of FIG. 1 may begin with a signal being presented on a terminal 90 connected by a conductor 92 to the signal generating device 30. This signal may be a mechanical button which is pushed by the operator or may be an automatic switching signal created in any convenient fashion.

Upon receipt of the zoom command at terminal 90, signal generator 30 will first operate to produce a signal on mechanical connections 28 and 48 at outputs A and B thereof. This causes the switch arm 44 to move from terminal 46 to terminal 50 and the turret 22 to begin changing from lens 24, the wide field of view lens, to lens 26, the narrow field of view lens. Upon closure of switch arm 44 with terminal 50, which occurs before lens 24 has moved out of the way, signals representative of the scene being viewed by camera 20 will be presented to storage device 54. After the storage device 54 has received at least one full frame of information from camera 20, switch arm 44 will move back up to its position of contact with empty terminal 46 and the "write" circuit of storage device 54 will continue to store the image last seen by wide field of view lens 24. Upon reclosure of switch arm 44 with terminal 46, output C of signal generator 30 will then operate to move switch arms 34 and 58 into contact with terminals 40 and 62 respectively. At this time, the "read" circuit of storage device 54 produces a signal to input connection 12 of zoom electronics 10 and during the turret change, the viewer will continue to see the view last seen by the wide field of view lens 24 which view may be caused to move because of the video rate signals or platform control signals if any, appearing on input conductor 78 of storage device 54.

When camera turret 22 has completed its change of position so that the narrow field of view lens 26 is in position, signal generator 30 will produce a signal D causing mechanical connection 18 to begin the zoom operation in the zoom electronics 10 as described in the above-referred to copending application Ser. No. 1,049.

Figure 2:
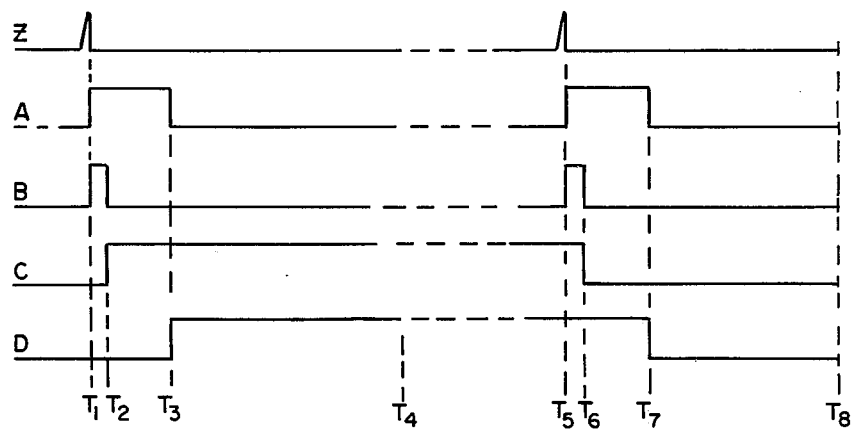
FIG. 2 shows the timing sequence or signals produced by the signal generator of FIG. 1.

Referring to FIG. 2, the various time sequences of the signals described in connection with FIG. 1 are shown. As seen in FIG. 2 at time $T_1$, the signal Z, shown as a voltage spike, occurs to start the operation. As soon as signal Z is received, signal generator 30 produces signals A and B which are shown rising from a low to a high value also at time $T_1$. At time $T_2$, which is sufficiently after time $T_1$ to allow a full frame from camera 20 to be fed to the storage device 54, signal B will return to a low state. The time necessary to load storage device 54 is so small that the lens 24 will not have moved appreciably and signal A will continue on to a time $T_3$ which is equal to the time necessary to move turret 22 so that the new lens is in position. Complete motion of the turret from one lens to another can generally be accomplished in about ½ second or so. At time $T_3$, signal A returns to a low state thus deactivating the mechanism that turns turret 22 and at the same time signal D is produced. This is shown in FIG. 2 as a signal rising from a low to a high state. Signal D operates the mechanical connection 18 of FIG. 1 to start the zoom operation as, for example, by driving the potentiometer wiper of the zoom electronics of the previously-mentioned copending application Ser. No. 1,049. Signals C and D continue at a high state. A time $T_4$ is shown in FIG. 2 representative of the conclusion of the zoom operation and at this time the viewer would see an entirely zoomed image from camera 20 drived via the narrow field of view lens 26.

To operate in reverse, the operator would create another Z signal at terminal 90 which is shown at $T_5$ in FIG. 2 thus again causing signals A and B to go from a low to a high state. Signal A begins driving turret 22 so as to remove the narrow field of view lens and bring the broad field of view lens 24 back into operation. Signal B again closes switch arm 44 so at least one frame of signals from camera 20, representative of the narrow field of view, is presented to storage device 54. When this has occurred at time $T_6$, signal C is caused to drop from the high state it was in after the zoom operation back to a low state thus moving switch arms 34 and 58 back into contact with terminals 36 and 60 respectively. The signals from storage device 54, representative of the last narrow field of view scene received by camera 20, will now be presented via terminal 60, conductor 61 and conductor 14 to the zoom electronics 10 so as to continue to present the viewer with the narrow field of view scene. This signal, again, may be modified by camera motion or scene motion from the video rate sensor 72 or the platform control terminal 80 as was described above. After the turret 22 has repositioned the wide field of view lens 24 in operative position at time T7, the D signal from signal generator 30 returns to a low state and causes, through mechanical connection 18, operation of the zoom electronics 10 to bring the wide field of view picture back in the manner described in the above-referred to copending application Ser. No. 1,049.

Figure 3:
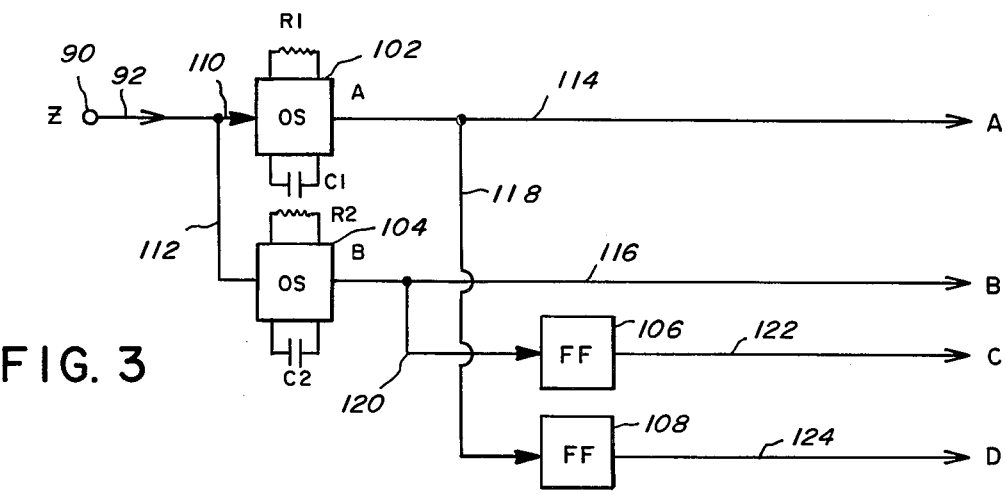
FIG. 3 shows a schematic diagram of the signal generator of FIG. 1.

The apparatus for creating the signals A, B, C and D of FIG. 2 is shown in FIG. 3. The signal generator 10 shown in FIG. 3 consists of a pair of one-shot multivibrators indentified by reference numerals 102 nad 104 respectively and a pair of flip-flops, identified by reference numerals 106 and 108 respectively. The input pulse Z from terminal 90 and line 92 in FIG. 1 is presented on lines 110 and 112 to trigger both one shots producing the A and B pulses described in connection with FIGS. 1 and 2 on lines 114 and 116 respectively as outputs. (The width of the pulses is controlled by the associated RC values shown as $R_1$ and $C_1$ connected to one shot 102 and $R_2$ and $C_2$ connected to one shot 104 in FIG. 3.) The outputs A and B of one shots 102 and 104 are connected to flip-flops 108 and 106 respectively by lines 118 and 120 respectively. The flip-flops are switched between high and low by the trailing edges of the pulses A,B and produce the pulses C and D, described in connection with FIGS. 1 and 2, on lines 122 and 124 respectively.

It is therefore seen that I have provided apparatus which will electronically zoom on a scene being viewed in a manner similar to that found in copending application Ser. No. 1,049 and have done so with a single camera thereby providing savings of cost and weight. Many changes and modifications to the circuits shown in connection with the preferred embodiment will occur to those skilled in the art. For example, while mechanical switches have been shown, electronic switches may be easily substituted. Likewise, many other forms of signal generating device 30, operable to produce the signals A, B, C and D, will occur to those skilled in the art. Also, zoom systems employing three or more cameras as described in the above-mentioned copending application Ser. No. 1,049 may be modified in a manner similar to that described hereon using a turret with three or more lenses and switching the signals into the zoom electronics at the proper time so as to provide the same function but with the use of only one camera. Accordingly, I do not wish to be limited by the descriptions used in connection with the preferred embodiment, but rather intend only to be limited by the following claims.

The embodiments of the invention in which an exclusive property or right is claimed are defined as follows:

1. Apparatus comprising:
   radiation sensing means providing an output signal indicative of the radiation received thereby;
   wide field of view means;
   narrow field of view means;
   means mounting said wide field of view means and said narrow field of view means in first and second interchangeable positions with respect to said radiation sensing means so as to direct radiation from a scene being viewed to said radiation sensing means;
   changing means operable to interchange said wide field of view means and said narrow field of view means;
   storage means having an input connected to receive and store the output of said radiation sensing means and to produce an output representative of the stored output of said radiation sensing means; and
   connective means connecting the output of said radiation sensing means to a first output connection while connecting the output of said storage means to a second output connection when said wide field of view means is in the first interchangeable position and connecting the output of said radiation sensing means to the second output connection while connecting the output of said storage means to the first output connection when said narrow field of view means is in the first interchangeable position.

2. Apparatus according to claim 1 wherein said connecting means includes switch means having a first input connected to receive the output signal from said radiation sensing means having a second input terminal connected to receive the output of said storage means, having first and second output terminals connected to the first output connection and the second output connection respectively and having third and fourth output terminals connected to the second output connection and the first output connection respectively.

3. Apparatus according to claim 2 including signal generating means operable to provide first and second command outputs, the first command output being connected to said changing means to produce operation thereof and said second command output being connected to said switch means to transfer the signals at the first and second inputs of said switch means from the first and third output terminals thereof to the second and fourth output terminals thereof respectively.

4. Apparatus according to claim 3 wherein the second command output occurs at a time after the first command output sufficient to permit the storage of a signal from the radiation sensing means in said storage means.

5. Apparatus according to claim 4 including a zoom system having a first input connected to the first output connection and a second input connected to the second output connection.

6. Apparatus for use with an electronic zoom system which system has a first input for receiving a wide field of view signal, a second input for receiving a narrow field of view signal and a third input for receiving a zoom command signal comprising:
   a camera having a broad field of view lens, having a narrow field of view lens and providing a first output representative of the image viewed by the camera;
   changing means operable to interchange the wide field of view lens and the narrow field of view lens into operable position with respect to said camera;
   storage means having an input to receive input signals representative of an image, operable to store an image created from the input signals and to provide a second output representative of the image stored in said storage means;
   first switch means operable in a first condition to connect said camera to the first input of the electronic zoom system so that the first output provides the wide field of view signal thereto and in a second condition to connect said camera to the second input of the electronic zoom system so that the first output provides the narrow field of view signal thereto;
   second switch means operable in a first condition to connect said storage means to the second input of the electronic zoom system so that the second output provides the narrow field of view signal thereto and in a second condition to connect said storage means to the first input of the electronic zoom system so that the second output provides the wide field of view signal thereto; and third switch means operable in a first condition to connect said camera to the input of said storage means so that the first output provides the input signal thereto.

7. Apparatus according to claim 6 including signal generating means operable to provide first, second, third and fourth command outputs, the first command output being connected to said third switch means to operate said third switch means to the first condition, the second command output being connected to said changing means to effectuate the interchange of the wide field of view lens and the narrow field of view lens, the third command output being connected to said first and second switch means to operate said first and second switch means from the first condition to the second condition, and the fourth command output being connected to the third input of the electronic zoom system to provide the zoom command signal thereto.

8. Apparatus according to claim 7 wherein said signal generating means has a command input which operates upon receiving a signal to start the production of the command outputs therefrom.

9. Apparatus according to claim 8 wherein upon receipt of a signal at the command input said signal generating means at a first time the first and second command outputs are produced, at a first predetermined time after the first time the third command output is produced and at a second predetermined time after the first time the fourth command output is produced.

10. Apparatus according to claim 9 wherein the first predetermined time is chosen to be sufficient to permit a complete image to be stored in said storage means and said second predetermined time is chosen to be sufficient to permit the interchange of the wide field of view lens and the narrow field of view lens.

* * * * *